United States Patent [19]

Jenkins

[11] Patent Number: 4,800,075

[45] Date of Patent: Jan. 24, 1989

[54] FIXED-BED HYDROGEN PEROXIDE CATALYST

[75] Inventor: Colie L. Jenkins, Memphis, Tenn.

[73] Assignee: E. I. Du Pont de Nemours and Company, Wilmington, Del.

[21] Appl. No.: 132,475

[22] Filed: Dec. 14, 1987

[51] Int. Cl.$^4$ .............................................. C01B 15/02
[52] U.S. Cl. .................................................. 423/588
[58] Field of Search ....................................... 423/588

[56] References Cited

U.S. PATENT DOCUMENTS

| | | | |
|---|---|---|---|
| 2,657,980 | 11/1953 | Sprauer | 423/588 |
| 3,009,782 | 11/1961 | Porter | 23/207 |
| 3,488,150 | 1/1970 | Käbisch et al. | 23/207 |
| 3,615,207 | 10/1971 | Lee | 23/207 |
| 3,635,841 | 1/1972 | Keith et al. | 423/588 |
| 3,887,490 | 6/1975 | Schreyer et al. | 423/588 |

FOREIGN PATENT DOCUMENTS 600788  6/1960  Canada ................................ 423/588
876459  8/1961  United Kingdom ................ 423/588

OTHER PUBLICATIONS

"Oxides and Hydroxides of Aluminum", Technical Paper No. 19, Alcoa Research Laboratories, (1972).
"Adsorption of Gases in Multimolecular Layers", *Journal of the American Chemical Society*, vol. 60, pp. 309–321, (2/1938).

*Primary Examiner*—Robert L. Stoll
*Assistant Examiner*—Wayne A. Langel

[57] ABSTRACT

An improved fixed-bed cyclic anthraquinone process for production of hydrogen peroxide wherein the improvement is using a hydrogenation catalyst comprising palladium or a mixture of palladium and platinum on a support containing alpha alumina. The preferred range of palladium is 0.1 to 3 weight percent and the preferred range of platinum, when present, is greater than 0.01 weight percent (based on the total weight of the catalyst). The preferred catalyst support contains greater than 5 percent alpha alumina.

5 Claims, No Drawings

FIXED-BED HYDROGEN PEROXIDE CATALYST

FIELD OF THE INVENTION

This invention relates to an improved process for the hydrogenation of alkyl substituted anthraquinones and tetrahydroanthraquinones in a cyclic process employing a fixed-bed reactor to produce hydrogen peroxide. The improvement comprises the use of catalysts comprising palladium or a mixture of palladium with a platinum prepared on a catalyst support containing alpha alumina.

BACKGROUND OF THE INVENTION

The anthraquinone process for making hydrogen peroxide is well known in the art to be a cyclic process in which 2-alkyl substituted anthraquinones, dissolved in a solvent or mixture of solvents are first hydrogenated in the presence of a hydrogenation catalyst to produce anthrahydroquinones. The anthrahydroquinones are then oxidized, usually with air, to reform the original anthraquinones with concomitant formation of hydrogen peroxide. The hydrogen peroxide is then generally extracted with water and the remaining working solution is dried to remove excess water and is recycled to the hydrogenation step.

During the hydrogenation of anthrahydroquinones, tetrahydroanthraquinones are also produced which in turn are reduced to tetrahydroanthrahydroquinones which form hydrogen peroxide upon oxidation. The term "quinone" is used generically to describe the oxidized state of the alkyl substituted anthraquinones and the alkyl substituted tetrahydroanthraquinones contained in the working solution. The term "hydroquinone" is used generically to describe the reduced state of the working solution.

Hydrogenation catalyst selectivity and activity are considered to be significant factors for obtaining lower cost operation and high utility in the anthraquinone process. U.S. Pat. No. 2,657,980 teaches the advantages of using palladium on activated alumina supports over the prior art of using Raney nickel catalysts. These advantages were attributed to the lower by-product formation rates of palladium and improved resistance of palladium to deactivating effects of hydrogen peroxide. This patent states that suspended catalysts on activated alumina give better results than when a fixed-bed catalyst is used under otherwise comparable conditions. Activated alumina was meant to describe any natural or synthetic hydrated alumina containing alpha alumina monohydrate, gamma alumina, or both. These materials typically have BET surface areas in the range of 100 to 300 square meters per gram (m$^2$/g). (BET is a method for measuring the surface area of material as described by Brunauer, Emmett, and Teller in their article "Adsorption of Gases in Multimolecular Layers" in the *Journal of the American Chemical Society*, Vol. 60, page 309, February 1938, and is well practiced in the art of describing catalysts and supports.)

The extraction efficiency of removal of hydrogen peroxide from working solution is generally less than complete. Extraction equipment is designed and is generally operated in a manner which minimizes the amount of unextracted hydrogen peroxide so as to improve hydrogen peroxide yield.

U.S. Pat. No. 3,887,490 teaches that reintroduction of from 250 to 30,000 milligrams (mg) of hydrogen peroxide with each liter (L) of working solution recycled to the hydrogenation step is beneficial for maintaining the activity of noble metal catalysts deposited on a carrier support such as alumina.

U.S. Pat. Nos. 3,635,841 and 3,615,207 teach the use of palladium deposited on alumina supports which are predominately delta and theta phases having essentially no alpha alumina phases present and BET surface areas in the range of 200 m$^2$/g to 20 m$^2$/g. These patents teach that these catalysts are particular useful for maintaining activity and selectivity in the case of a fixed-bed, whereas catalysts prepared on predominately alpha alumina exhibit loss of metal and have rather short life times in a fixed-bed.

U.S. Pat. No. 3,488,150 teaches that catalysts containing palladium in admixture with from 0.1 to 50 weight percent of another metal of the platinum group are useful as hydrogenation catalysts for the anthraquinone process to improve hydrogenation selectivity and/or activity. The improvements sought in that work were suppression of ring hydrogenation of the anthraquinones to tetrahydroanthraquinones and octahydroanthraquinones. High concentrations of ring hydrogenated materials are undesirable as their hydrogenated forms are more difficult to oxidize to form hydrogen peroxide and the octahydroanthraquinone species have low solubility in normal solvent mixtures used for the anthraquinone process. The mixed metal catalyst were shown to exhibit improved selectivity for ring hydrogenation when they were intimately mixed as a suspension catalyst of 0.01 to 1.0 micron size, but exhibited no selectivity improvement when deposited on a support such as active alumina oxide, the phase and composition of which were undefined. No advantage for the mixed metal catalysts in fixed-bed operation is cited.

We have found that reintroduction of hydrogen peroxide in concentrations greater than 160 mg/liter produces the formation of acidic products which strongly adhere to the catalyst. The concentration of these acidic products continue to increase with time and/or increasing concentration of hydrogen peroxide. These acidic products cause loss of selectivity of the hydrogenation of the anthraquinones to form undesirable by-products which increase the cost of manufacture and lower the productivity of the system.

The buildup of acidic products eventually shortens the useful life of the catalyst because of low activity and loss of selectivity. The level of acidic products on the catalyst can be controlled by removal of a portion or all of the catalyst periodically and replacement with regenerated or freshly prepared catalyst. Alternatively, the catalyst may be regenerated in place. Also, when the concentration of hydrogen peroxide reintroduced in the working solution which is recycled to the hydrogenator is greater than 400 mg/liter, there is a very rapid formation of acidic products and generation of sufficient quantities of carbon monoxide to cause nearly complete loss of activity, necessitating catalyst replacement or regeneration to restore activity and selectivity.

The source of the acidic products is unknown at this time, but there is evidence that the acidic products result from an oxidation reaction of hydrogen peroxide with organic materials contained in the working solution. Oxalic acid is a major end product of this oxidation process, as it has been identified on the catalysts and its concentration increases with increasing concentration of hydrogen peroxide fed to the catalyst during hydrogenation or with operating time at low concentrations of hydrogen peroxide.

This production of acidic by-products is undesirable for all forms of noble metal catalysts on a support, but is particularly damaging to a fixed-bed catalyst system. Hydrogen peroxide entering a fixed-bed hydrogenator continually contacts the same portion of catalyst at the inlet of the reactor, thereby increasing acidic product concentration on the catalyst in the inlet section more rapidly then elsewhere in the reactor. Also, the formation of carbon monoxide in the inlet section can cause subsequent activity loss in the remaining portion of the bed. In the case of slurry or suspended catalysts, the formation of acidic by-products is generally distributed more uniformly over the entire catalyst and, therefore, increases in concentration at a much lower rate at a given concentration of hydrogen peroxide.

Unexpectedly, it has been found in the present work that catalysts prepared on supports with alpha alumina retain their metal composition, have very low adsorption of acidic products, and retain their activity and selectivity for commercially serviceable times. These catalysts are also more resistant to concentrations of hydrogen peroxide which can cause deactivation of the hydrogenation catalyst and formation of acidic products on the catalyst.

DETAILED DESCRIPTION OF THE INVENTION

The present invention is an improved cyclic process employing a fixed-bed reactor for production of hydrogen peroxide. Such a fixed-bed process is described in U.S. Pat. Nos. 3,615,207 and 3,009,782 which are incorporated by reference. The cyclic fixed-bed process, in general, comprises a number of steps. Alkyl substituted anthraquinone or tetrahydroanthraquinone species (quinones) dissolved in a suitable solvent mixture selected so that both quinones and the reduced quinones (hydroquinones) are soluable are initially reduced in the presence of a hydrogenation catalyst. The quinones, hydroquinones and by-products together with the solvent mixture is commonly referred to as working solution. Next is the oxidation of the resulting reduced quinones with the concomitant production of hydrogen peroxide, followed by water extraction of the hydrogen peroxide from the working solution, drying of the working solution, and recycling of the dried working solution back to the hydrogenation step.

This invention relates to use of a hydrogenation catalyst which comprises palladium deposited on a catalyst support that contains alpha alumina. Use of such a catalyst provides improved retention of catalyst selectivity and activity, particularly from exposure to hydrogen peroxide concentrations in the working solution greater than 160 mg/liter.

Preferably the palladium is present in a range of 0.1 to 3 weight percent of the total weight of the catalyst. Another preferred embodiment is a mixture of 0.1 to 3 weight percent palladium with greater than 0.01 weight percent platinum (based on the total weight of the catalyst).

For the purposes of the present invention, alpha alumina (also known as corundum) is meant to describe the hexagonal, close-packed form of alumina. Since X-ray diffraction patterns of the alumina phases are distinct, X-ray diffraction was used to identify the amount of alpha alumina contained in the samples evaluated in the Examples. Alpha alumina is the most thermodynamically stable form of alumina and will be produced regardless of the initial state of the alumina if the material is heated high enough (to temperature greater than 1000° C.) for a long enough period of time. See Alcoa Technical Paper No. 19 by K. Wefers and G. M. Bell published by Alcoa Research Laboratories, 1972, for a comprehensive overview of alumina chemistry and physical properties of alumina supports.

Preferably the catalyst support contains greater than 5 weight percent alpha alumina. It should contain less than 100 weight percent to facilitate the adherence of the noble metal. The preferred catalyst has an 8 to 18 USS mesh size. The BET surface area should be less than 108 $m^2/g$. At higher weight percent alpha alumina, the BET surface area decreases. At 99 weight percent alpha alumina, a BET surface area should be about 5 $m^2/g$.

It is envisioned that catalyst supports can contain more than alumina. Other constituents, for example, may be silica, titanium dioxide and carbon.

EXAMPLES

The following examples are given as further illustration of the invention but not by way of limitation.

The selectivity of a catalyst is a measure of the amount of useful quinone that remains in the process. As more quinone is degraded to species that will not regenerate quinones in the cyclic process, the selectivity is said to decrease. Selectivity can be measured by the degradation of active quinone (both alkyl substituted anthraquinones and tetrahydroanthraquinones), degradation being the amount of active quinone which is transformed to non-hydrogen peroxide producing species in a given time period. In determining selectivity, it is also useful to follow the anthrone content of the working solution, since the analysis of this component by a colorimetric method is very accurate and changes in this component correlate with the amount of degradation of the total quinone. Anthrones are produced as degradation products of anthraquinones in the hydrogenation step.

In the following examples, both quinone and anthrone concentrations were determined periodically and their concentrations corrected for any changes in solvent composition and then analyzed by linear regression analysis to obtain their changes in composition with time. The change in composition of these components is based on the total weight of the working solution.

EXAMPLES 1 to 5

This series of examples demonstrates the improved selectivity, activity retention, metal retention, and lower amounts of acidic products formed on catalysts of palladium and palladium combined with platinum prepared on 13 to 98 wt % alpha alumina with BET surface areas of 98 to 10 $m^2/g$ when operated in a range of 240 to 410 mg/liter of hydrogen peroxide entering with hydrogenator feed.

These experiments were conducted in a cyclic unit in which the hydrogenator was sized to accommodate 1 liter of fixed-bed catalyst of 8 to 18 USS mesh size. Flow through the hydrogenator was concurrent downflow of working solution and hydrogen. This cyclic unit contained all the normal steps in an anthraquinone process which are, hydrogenation, oxidation, extraction, drying, and working solution regeneration.

The working solution used in these examples was a mixture of 2-butyl and 2-amyl anthraquinones and their corresponding tetrahydroanthraquinones in which the tetrahydroanthraquinone components accounted for about 60% of the total quinone. The total quinone content of this working solution typically amounted to 25 to 26 weight percent of the mix. These quinones were dissolved in mixed solvent system of alkylated benzenes ("Aromatic 150") and an aliphatic alcohol (diisobutylcarbinol). The solution also contained inert and degraded quinone products.

Since this working solution already contains some anthrone species, it is possible to have a reduction in anthrone concentration and also an increase in quinone concentration by regeneration of by-products under good hydrogenation catalyst selectivity performance. Unless otherwise noted in these examples the yield of hydrogen peroxide from the amount of hydroquinone produced was about 80 to 85%.

In addition to Examples run in the cyclic unit, some Examples were run in a sidestream unit which was sized to contain 11.5 liters of fixed-bed catalyst of 8 to 18 USS mesh size. Working solution from an operating, commercial, hydrogen peroxide unit was fed cocurrently with hydrogen to this unit. This unit had hydrogenation facilities only and was used to evaluate long term activity performance and provide aged test samples for evaluation of selectivity in the cyclic unit described above.

EXAMPLE 1

This example shows the typical activity loss, oxalic acid buildup, and selectivity loss experienced with operating time on a 8 to 14 USS mesh catalyst with 0.40 weight percent palladium prepared on a 13% alpha alumina support with a BET surface area of 98 $m^2/g$.

The sidestream unit was charged with the above catalyst and operated for a total of 83 days. Typical operating conditions were a forward feed rate of 2.0 liters/minute with a recycle feed rate of 2.0 liters/min. for a total of 4.0 liters/min. of working solution through the catalyst bed which was 53.9 $cm^2$ in cross sectional area. The reactor top pressure was 55 psig, feed temperature was 38° C., and the hydrogen feed rate was 20 liters/min. Concentration of the hydrogen peroxide in the feed to the reactor was typically in the range of 245 to 326 mg/liter. The initial extent of hydrogenation was 0.48 g mole/liter of hydroquinone which declined regularly over the first 50 days to 0.30 g mole/liter and then declined more slowly to 0.276 g mole/liter over the next 33 days.

Analysis of the catalyst sampled at the top of the reactor showed the oxalic acid content to be 20,400 ppm after 53 days of operation and 37,800 ppm after 83 days versus a non-detectable amount on the fresh catalyst.

Evaluation of one liter of this catalyst withdrawn from the sidestream unit after the 83 days of operation was performed in the cyclic unit at a hydrogenation temperature of 50° C., reactor pressure of 35 psig, 50 mL/min feed rate with 1 liter/min recycle rate, a hydroquinone concentration of 0.384 g mole/liter controlled by the feed rate of hydrogen to the unit, and an average concentration of 245 mg/liter of hydrogen peroxide in to the hydrogenator feed. The resulting selectivity was a quinone loss of 3.47 wt. % and an anthrone gain of 2.29 wt. % averaged over a 250 hour period. In contrast, the selectivity of this catalyst in its new state under similar conditions was measured to be a quinone loss of 0.32 wt. % and an anthrone loss of 0.09 wt. %.

EXAMPLE 2

The sidestream unit unit was charged with an 8 to 14 USS mesh catalyst with 0.283 wt. % palladium prepared on a 72% alpha alumina support with a BET surface area of 39 $m^2/g$. and operated as described in Example 1 for 60 days. The initial extent of hydrogenation was 0.48 g mole/liter which declined to 0.36 g mole/liter over the 60 days of operation. The oxalic acid content of the catalyst was found to be 2,408 ppm at the end of the 60 days versus a non-detectable amount on the fresh catalyst. Analysis for palladium content after the 60 days gave a value of 0.308 wt. % indicating no loss of metal had taken place.

Evaluation of the above catalyst sampled from the sidestream unit after 60 days of operation in the cyclic unit as described in Example 1 resulted in a selectivity of a quinone loss of 0.8 wt. % and an anthrone loss of 0.1 wt. % averaged over a 250 hour period.

EXAMPLE 3

The sidestream unit was charged with an 8 to 14 USS mesh catalyst with 0.272 wt. % palladium and 0.083 wt. % platinum prepared on a 98% alpha alumina support with a BET surface area of 10 $m^2/g$ and operated as described in Example 1 for 60 days. The initial extent of hydrogenation was 0.425 g mole/liter which remained unchanged within experimental error for the 60 days of operation. After 60 days of operation, the catalyst was sampled and only 904 ppm. of oxalic acid was found versus a non-detectable level on the fresh catalyst. Analysis of the catalyst for metals after the 60 days of operation showed 0.285 wt. % palladium and 0.080 wt. % platinum indicating no loss of the noble metals had occurred.

Evaluation of a one liter sample of the catalyst withdrawn from the sidestream unit after the 60 days of operation was performed as described in Example 1. The selectivity was a quinone loss of 0.15 wt. % and an anthrone increase of 0.07 wt. % averaged over a 250 hour period.

EXAMPLE 4

This example shows the activity loss of a 0.3 weight percent palladium prepared on a gamma alumina phase support with a BET surface area of 190 $m^2/g$. This catalyst was evaluated in the cyclic unit with an average hydrogen peroxide content in the hydrogenator feed of 245 mg/liter as described in Example 1. The initial extent of hydrogenation was 0.264 g mole/liter, which was limited by the activity of the catalyst, and declined in a linear manner over the 185 hours of evaluation to 0.052 g mole/liter. There was essentially no change in quinone or anthrone concentration during this period, but selectivity performance is not meaningful in light of the lower initial activity (extent of hydrogenation) and loss of activity experienced.

EXAMPLE 5

This example shows the performance from a catalyst with 0.30 weight percent platinum on a gamma alumina support with essentially no alpha alumina and having a BET surface area of 104 $m^2/g$. The catalyst was evaluated in the cyclic unit for a total of 83 hours and operated at an average hydroquinone production rate (extent of hydrogenation) of 0.30 g mole/liter, which was limited by catalyst activity, and showed a declining trend over the run. The yield of hydrogen peroxide from hydroquinone was essentially zero throughout this evaluation due to decomposition of the hydrogen peroxide formed, decomposition occuring in both the oxidation and extraction equipment. Examination of the catalyst after the test period showed the metal content to be 0.22 weight percent platinum. Selectivity data is not meaningful due the short duration of this test.

EXAMPLES 6 to 16

This series of examples was designed to show the improved selectivity, activity retention, and lower amounts of acidic products formed on alpha alumina catalysts with palladium or palladium and platinum mixtures, particularly when operated at hydrogen peroxide levels greater than 400 mg/liter.

Higher levels of hydrogen peroxide were controlled by pumping an appropriate amount of oxidized and unextracted working solution from the oxidizer exit which contained hydrogen peroxide directly into the hydrogenator working solution feed line on the cyclic unit described in Example 1.

EXAMPLE 6

In the cyclic unit, a one liter sample of unused 0.35 wt. % palladium on 10% alpha with a surface area of 98 $m^2/g$ was operated as described in Example 1 for 275 hours with a typical level of 286 mg/liter of hydrogen peroxide. The hydroquinone production level remained unchanged at 0.396 g mole/liter and no quinone loss or anthrone gain was experienced during this 275 hours of operation.

The concentration of hydrogen peroxide was then increased from 286 to 1020 mg/liter for 120 hours and then further increased to 1840 mg/liter for an additional 240 hours. Attendant with the increase in hydrogen peroxide entering the hydrogenator, the quinone composition began decreasing and anthrone production began. During these higher levels of hydrogen peroxide operation, the loss of quinone was 1.68 wt. % and the anthrone increase was 0.30 wt. % averaged over 250 hours. The oxalic acid content of the catalyst was found to 10,815 ppm at the end of this test.

EXAMPLES 7 to 11

In Examples 7 to 11 in the cyclic unit using 250 mL of catalyst it was found that the hydrogenation activity was significantly impaired at levels of hydrogen peroxide exceeding 286 mg/liter and that the rate of activity loss and carbon monoxide formation was dependent on the age or degree of contamination present on the catalyst. Previously unused catalyst was more resistant to the same level of hydrogen peroxide then catalyst which had been operated for several months as shown in Table I. These tests were too short in duration to produce meaningful data on selectivity.

TABLE I

| 0.35 PALLADIUM ON 10% ALPHA ALUMINA | | | | |
|---|---|---|---|---|
| Example | Catalyst | Level of $H_2O_2$ mg/liter | ppm Carbon Monoxide in Vent | % Loss of Activity |
| 7 | New | 286 | 1.0 | 2 |
| 8 | New | 860 | 5.0 | 22 |
| 9 | New | 1550 | 30.0 | 75 |
| 10 | Aged 2 Months | 286 | 4.0 | 44 |
| 11 | Aged 2 Months | 860 | 10.0 | 82 |

TABLE I-continued

| 0.35 PALLADIUM ON 10% ALPHA ALUMINA | | | | |
|---|---|---|---|---|
| Example | Catalyst | Level of $H_2O_2$ mg/liter | ppm Carbon Monoxide in Vent | % Loss of Activity |

Notes:
Hydrogen peroxide concentration is in the feed to the hydrogenator. Activity loss is the % decrease in hydroquinone production from a initial level of 0.24 g mole/liter.

EXAMPLE 12

A one liter sample of 0.283 wt. % palladium on 72% alpha alumina with a surface area of 39 $m^2/g$ was placed in the cyclic unit and operated for 280 hours at an average level of 286 mg/liter of hydrogen peroxide in the feed to the hydrogenator. The hydroquinone production remained steady at 0.388 g mole/liter and no quinone loss or anthrone production occurred during this evaluation. The oxalic acid content of the catalyst at the end of the 280 hours was 545 ppm.

A second one liter sample of the catalyst above was tested in the cyclic unit for 320 hours in which the hydrogen peroxide in the feed to the hydrogenator was increased from 245 to 1225 mg/liter after 60 hours of operation. Hydroquinone production remained steady at 0.384 g mole/liter throughout the higher peroxide level and no carbon monoxide was detected in the vent gas. The quinone concentration showed an increase of 0.64 wt. % and the anthrone content of the working solution showed a 0.12 wt. % increase averaged over a 250 hour period. The anthrone content began showing an increasing trend concomitant with the increase of hydrogen peroxide to the hydrogenator. The oxalic acid content of the catalyst was 5200 ppm at the end of the 320 hours of testing.

EXAMPLE 13

A one liter sample of 0.293 wt. % palladium on 96% alpha alumina with a surface area of 11 $m^2/g$ was operated in the cyclic unit for 296 hours at an average level of 286 mg/liter of hydrogen peroxide in the hydrogenator feed. The hydroquinone production level remained steady at 0.384 g mole/liter throughout this test. The quinone concentration decreased 0.47 wt. % and the anthrone concentration increased 0.03 wt. % averaged over 250 hours of operation.

The same catalyst was then operated at a level of hydrogen peroxide in the hydrogenator feed of 530 mg/liter for 50 hours and then at 1265 mg/liter for 30 hours. When this second increase occurred the hydroquinone production decreased from 0.384 to 0.24 g mole/liter. The hydrogen peroxide level in the hydrogenator feed was then decreased to 898 mg/liter and activity as measured by hydroquinone production returned to 0.36 g mole/liter. This level of hydrogen peroxide was maintained for an additional 160 hours to give a total run time of 240 hours. The quinone loss for this test was 4.15 wt. % and the anthrone increase was 2.28 wt. % averaged over a 250 hour period. The oxalic acid content of the catalyst at the end of the test measured 1800 ppm.

EXAMPLE 14

A one liter sample of 0.32 wt. % palladium and 0.099 wt. % platinum catalyst prepared on a 14% alpha alumina support with a surface area of 98 $m^2/g$ was evaluated in the cyclic unit with an average hydrogen peroxide content in the reactor feed of 245 mg/liter for 299 hours. The hydroquinone production level remained steady at 0.384 g mole/liter and the quinone concentration showed a gain of 0.62 wt. % and the anthrone concentration decreased 0.17 wt. % averaged over a 250 hour period. The hydroquinone production level was increased to 0.455 g mole/liter and the catalyst was operated for an additional 256 hours at the same hydrogen peroxide level in the reactor feed. During this period, the quinone concentration had a gain of 0.79 wt. % and the anthrone concentration increased 0.01 wt. %. The oxalic acid level on the catalyst after this 555 hours of operation was found to be 890 ppm. The level of hydrogen peroxide in the reactor feed was then increased to an average level of 938 mg/liter and catalyst operated for an additional 284 hours at this condition. The hydroquinone production level remained steady at 0.404 g mole/liter throughout this period and the quinone concentration decreased 0.28 wt. % and the anthrone concentration increased 0.01 wt. % averaged over a 250 hour period. The oxalic acid content of the catalyst showed an increase from the 890 ppm level to 4278 ppm during this 284 hour period.

EXAMPLE 15

A one liter sample of 0.272 wt. % palladium and 0.034 wt. % platinum catalyst prepared on a 98% alpha alumina support with a surface area of 10 $m^2/g$ was evaluated for 389 hours at an average hydroquinone production rate of 0.391 g mole/liter. The hydrogen peroxide in the hydrogenator feed averaged 245 mg/liter during this time frame and the quinone concentration decreased 0.41 wt. % and anthrone increased 0.02 wt. % averaged over a 250 hour period. The oxalic acid content on the catalyst was found to be 201 ppm after this 389 hours. The catalyst was then evaluated for additional 403 hours at an average hydrogen peroxide level of 1225 mg/liter. The hydroquinone production level remained steady during this period and averaged 0.354 g mole /liter. The quinone concentration increased 0.04 wt. % and the anthrone concentration increased 0.11 wt. % averaged over a 250 hour period. The oxalic acid content of the catalyst increased from 201 ppm level to 2084 ppm during this 403 hours.

EXAMPLE 16

A one liter sample of 0.176 wt. % palladium and 0.078 wt. % platinum catalyst prepared on an 98% alpha alumina support with a surface area of 10 $m^2/g$ was evaluated for 31 hours in the cyclic unit. The hydroquinone production level remained steady at 0.380 g mole/liter during this evaluation. The initial 80 hours of this evaluation was performed at a hydrogen peroxide level in the hydrogenator feed of 245 mg/liter and then the level was increased to 2448 to 3060 mg/liter of hydrogen peroxide for the next 80 hours of operation, the hydrogen peroxide level averaged 1020 mg/liter for the remainder of the evaluation. Attendant with the increase of hydrogen peroxide in the hydrogenator feed the quinone concentration began decreasing and the anthrone concentration began increasing. The quinone concentration decrease averaged 2.46 wt. % and the anthrone increase averaged 0.33 wt. % over a 250 hour period. The oxalic acid content of the catalyst was found to be 2058 ppm at the end of the 231 hours of testing.

EXAMPLE 17

A one liter sample of 0.278 wt. % palladium and 0.078 wt. % platinum catalyst prepared on a 95% alpha alumina support with a BET surface area of 10 $m^2/g$ was evaluated in the cyclic unit. The first 300 hours of operation was conducted at a hydrogen peroxide content in the feed of 245 mg/liter and then the hydrogen peroxide was increased to 1877 mg/liter for the next 60 hours of operation. Activity of the catalyst remained unchanged as measured by hydroquinone production which was 0.382 g mole/liter throughout this period. The quinone concentration showed a very small loss of 0.2 wt. % and the anthrone concentration decreased 0.2 wt. % averaged over a 250 hour period. The oxalic acid content of the catalyst was found to be 612 ppm at the end of this 360 hours of testing.

After the 360 hours of testing, the catalyst was further evaluated for an additional 383 hours as follows. The level of hydrogen peroxide in the reactor feed was increased linearly over the 383 hour test period from 122 mg/liter to 1224 mg/liter. Hydroquinone production remained level at 0.368 g mole/liter throughout the test. The quinone concentration showed a very small increase of 0.2 wt. % and the anthrone concentration was essentially unchanged showing a loss of 0.03 wt. %. The oxalic acid content was also essentially unchanged showing 697 ppm versus an initial concentration of 612 ppm.

I claim:

1. In a cyclic process employing a fixed-bed reactor for the production of hydrogen peroxide involving hydrogenating a working solution comprising quinones dissolved in solvents in the presence of a hydrogenation catalyst, oxidizing the hydrogenated working solution, separating the hydrogen peroxide from the oxidized working solution and then recycling the working solution for further hydrogenation, the improvement comprising the use of a catalyst comprising palladium deposited on a catalyst support which contains alpha alumina, wherein the alpha alumina content is about 5 to 99 percent of the support and the surface area by BET measurement of the supported catalyst is from about 108 to 5 $m^2/g$.

2. The process of claim 1 wherein platinum is in admixture with the palladium.

3. The process of claim 1 wherein the palladium content is 0.1 to 3 weight percent based on the weight of the catalyst.

4. The process of claim 2 wherein the palladium is 0.1 to 3 weight percent and the platinum content is greater than 0.01 weight percent based on the weight of the catalyst.

5. The process of claim 1 wherein the quinones are alkyl anthraquinones or alkyl tetrahydroanthraquinones or mixtures of alkyl anthraquinones and alkyl tetrahydroanthraquinones.

* * * * *